United States Patent Office 3,149,131
Patented Sept. 15, 1964

3,149,131
PURIFICATION OF OXIRANES BY REDUCTION OF CARBONYL IMPURITIES WITH TRIVALENT NITROGEN COMPOUNDS
Paul D. Bartlett, Weston, Mass., assignor, by mesne assignments, to Pittsburgh Plate Glass Company
No Drawing. Filed July 15, 1960, Ser. No. 42,965
7 Claims. (Cl. 260—348)

This invention relates to the manufacture of oxiranes and to the purification of oxiranes, particularly oxiranes containing up to about 12 carbon atoms. It further relates to the removal of carbonyl-bearing impurities from oxiranes.

Oxiranes, also commonly known as alkylene oxides, alkene oxides or epoxyalkanes, contain the characteristic group

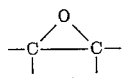

and are manufactured by two well known procedures chief of which is the reaction of a chlorohydrin with an alkali. As a result of the classic reaction of chlorohydrin with alkali, various impurities such as ethers, aldehydes and ketones are formed. However, the most widely known member of this class of compounds, ethylene oxide, is now successfully manufactured by direct oxidation of ethylene to ethylene oxide containing similar carbonyl-bearing impurities.

In the reaction of chlorohydrin with alkali it is frequently found expedient to react a dilute aqueous solution of the chlorohydrin resulting from hypochlorination of olefin with a suitable alkali at an elevated temperature such that the lower boiling oxirane product which forms rapidly on contact with the alkali is converted to a vapor thus removing it from the reaction zone in a short period of time to minimize side reactions in which the oxirane may react further with hydroxyl groups. These hydroxyl groups may be contributed by unconverted chlorohydrin. In this manner certain oxiranes are obtained in a high state of purity being contaminated chiefly with small quantities of impurities which contain the characteristic carbonyl

group such as aldehydes and ketones. Oxiranes recovered from other manufacturing processes may be contaminated with impurities containing the characteristic carbonyl group as occurring in esters or amides. These impurities are usually present in small amounts often as low as 0.001 percent by weight based upon the weight of the oxirane. However the concentration of these impurities frequently may be much higher although their concentration rarely exceeds 10 percent, and when the oxirane is produced from the corresponding chlorohydrin usually is less than 2 percent by weight based upon the weight of the oxirane. The exact identity of the impurities frequently is unknown. However they exhibit the presence of the carbonyl group when subjected to conventional tests. Water is also a contaminant in the resulting crude product.

In many of the uses to which the oxirane will be put even small quantities of the carbonyl impurity are objectionable. For example, propylene oxide is a starting material for polyglycols which, by reaction with diisocyanates, yield polyurethane foams. The presence of aldehyde in such propylene oxide can result in the formation of polypropylene oxide polymer containing shortened polymer chains and therefore unduly low molecular weight polymer production may result. Hence, a rigid specification on propionaldehyde content is imposed by consumers of propylene oxide.

Separation of impurities from propylene oxide is accomplished by fractional distillation. Carbonyl-bearing impurities including acidic carbonyl-bearing impurities as well as water are frequently contaminants. The customary fractional distillation suffices to reduce the concentration of many of the impurities ordinarily present in alkene oxides. However, the specifications which are imposed by consumers of propylene oxide are frequently so rigid that reduction of the impurity level to a satisfactorily low level is extremely difficult and often impossible to attain with ordinary fractionating equipment. Also, in some cases, carbonyl-bearing impurities are present which have boiling points close to the boiling point of the alkene oxide. In particular propionaldehyde has a boiling point of 48.8° C., propylene oxide a boiling point of 34–35° C. and acetone, another possible impurity, a boiling point of 56° C. Acetone is miscible with water in all proportions and also has a higher boiling point than the oxide, either property being sufficient to render its separation from propylene oxide a trivial problem. However the proximity of the aldehyde boiling point to that of propylene oxide attendant upon the low order of magnitude of contamination which is permissible renders the separation of aldehyde from propylene oxide a matter of somewhat greater difficulty. This type of purification is usually practiced commercially in a rectifying still where high theoretical plate value or high reflux ratio or a combination of both are required to effect the desired degree of separation.

In accordance with this invention an impure oxirane which is contaminated with a minor amount of carbonyl impurity is purified by contacting the impure oxirane with a compound containing at least one trivalent nitrogen atom to which at least two hydrogen atoms are attached and which gives an alkaline reaction in water, the amount of nitrogen compound selected being sufficient to react with at least a portion of the carbonyl impurity but not sufficient to consume more than about 10 percent of the oxirane, and separating the oxirane from the resulting mixture.

In one specific embodiment of the invention propylene oxide prepared by treatment of propylene chlorohydrin with alkali in the conventional manner and containing a minor concentration of propionaldehyde, acetone or like carbonyl-bearing material may be purified by contacting it with semicarbazide hydrochloride dissolved in water. Frequently the effectiveness of the reaction may be improved by adjusting the reaction mixture to a pH of from 4 to 7 by the addition of a salt of an acid having a dissociation constant less than 0.05. Sodium acetate is useful for this purpose. Thereafter purified propylene oxide can be obtained by fractionally distilling the resulting mixture.

Practice of this invention to remove carbonyl impurities from alkene oxides is complicated by the fact that oxiranes will also react with the above described nitrogen compounds. For example, ethylene oxide reacts with ammonia to form ethanolamine. Under suitable conditions all alkene oxides can be made to react with the type of nitrogen compounds described. It has been found according to this invention that the carbonyl-type impurities such as aldehyde may be caused to react with these compounds of nitrogen herein described to the substantial exclusion of any reaction with the alkene oxide. This may be achieved by employing small amounts of nitrogen compound. This amount depends to a large degree upon the economic and other factors involved. It should, of course, be large enough to react with at least a portion (usually 10 percent or more) of the carbonyl groups. Use of more than enough nitrogen compound to react with all of the carbonyl groups may result in consumption of a portion of the oxirane. Whether this is tolerable depends upon the economic value of the reaction products. In general the amount should not be so great that consumption of more than 10 percent (and preferably less than 5 percent by weight of the oxirane can result.

The carbonyl impurity apparently reacts with the semicarbazide or like nitrogen compound in the proportion of one carbonyl group per —$NH_2$ group. Thus, it is desirable to use enough of the nitrogen compound to supply to the resulting mixture at least 0.1 —$NH_2$ group per carbonyl group. In general the amount of nitrogen compound supplied does not exceed one —$NH_2$ group per carbonyl group plus 0.1 —$NH_2$ group per epoxy group

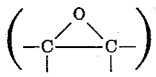

Nitrogen compounds which may be used according to this invention are: ammonia; amines such as methylamine, dodecylamine, aniline and ethanolamine up to and including amines containing about 12 carbon atoms and including aromatic amines which give an alkaline reaction in aqueous systems; hydrazine; substituted hydrazines such as methylhydrazine, butylhydrazine, 1,1-dimethylhydrazine, 1-methyl-1-phenylhydrazine, 2,4-dinitrophenylhydrazine and other hydrazine derivatives containing up to about 12 carbon atoms attached to the hydrazino group; hydroxylamine; semicarbazide and semicarbazide derivatives containing any alkyl, aryl or aralkyl group up to about 12 carbon atoms substituted on the ureido nitrogen atom; etc.

In carrying out the subject invention many ways of accomplishing the desired results are at once evident to one skilled in the art. When a minor concentration of aldehyde impurity is present in a relatively pure liquid oxirane, it is expedient to add the oxirane to an equal volume of water in which semicarbazide hydrochloride has been dissolved to form approximately a 10 percent solution along with sodium acetate in an amount sufficient to form a 15 percent solution of sodium acetate in the water. The reaction mixture is then agitated. This agitation can be accomplished by a variety of methods including heating to produce reflux of the oxirane present at its normal boiling point but at a temperature insufficiently high to cause decomposition and unwanted side reactions. Any amount of semicarbazide hydrochloride more or less than the stoichiometric amount equivalent to the carbonyl-impurity may be employed. However if an amount of semicarbazide hydrochloride greater than that equivalent to the carbonyl impurity is employed, some fraction of the excess will react with oxirane to reduce the amount of purified material which is recoverable. If one employs less than a stoichiometric amount, some portion of the carbonyl-bearing impuriites will not be consumed and will remain with the reaction product to be recovered with the purified material, and in this case will result in only partial purification.

While certain carbonyl-containing compounds are of low reactivity and necessitate the application of heat to raise the reaction temperature sufficiently to complete the reaction in a desirable length of time, the temperature at which the purification may be conducted lies between 0° C. and 100° C. A suitable reaction rate may be obtained at any convenient temperature level below the decomposition temperature of the oxirane, for example, in the range of 30° C. to 50° C. Ethylene oxide boils at 10° C. and requires that a small amount of external pressure be applied in order to maintain the oxide in a liquid state. Hence, the reaction may be desirably carried out under the influence of pressures up to five atmospheres. In certain instances reduced pressures may also be desirable in order to separate purified oxides from other components of the mixture on completion of the reaction.

The length of time required to complete the reaction is related to temperature, but it has been found that usually a time period of 30 minutes will suffice. The application of higher temperature may be employed when it is desirable to complete the reaction in a shorter period.

Water or other solvents may be present. Since the nitrogen compounds herein used may be soluble in water, it is sometimes preferable to carry out the reaction in water in which case the amount of water employed preferably should not be so great as to cause undue dilution of the reaction medium. Thus, for most purposes in such a case, the aqueous phase may contain as low as 1 percent to as high as 15 percent of the nitrogen compound. Likewise, when a catalyst such as sodium acetate is employed, an amount of this material in the aqueous phase varying from 1 percent to 30 percent by weight of the aqueous phase will suffice.

Typical of the alkylene oxides which may be successfully purified in accordance with this invention are ethylene oxide, propylene oxide, cis-2,3-epoxybutane, trans-2,3-epoxybutane, butadiene monoxide, butene oxide, amylene oxide, 1,2-hexene oxide, epoxycyclohexene, styrene oxide, α-naphthylethylene oxide, diglycid ether, glycidol, epichlorohydrin, epoxycyclopentane, vinylcyclohexene oxide, etc.

Carbonyl impurities which may be removed from oxiranes by practicing this invention include: acetaldehyde, propionaldehyde, butyraldehyde, isobutyraldehyde, acetone, methyl ethyl ketone, diethyl ketone, and esters of acetic acid, propionic acid or like carboxylic acids.

When sufficient time has elapsed to insure completion of the reaction of carbonyl impurities with semicarbazide, heating is continued in such a manner that distillation of the alkylene oxide results. Suitable means for collection of the distillate are provided to obtain a condensate which is now substantially free from carbonyl impurities.

Other means of recovering purified alkylene oxide also may be employed depending on the physical properties such as solubility and boiling point of the various species present. It is expedient to carry out the purification in an organic solvent in cases such that the initial chlorohydrin employed in preparation of the oxirane is insoluble in water and in cases such that a processing complication would otherwise result from an insoluble reaction product. In the event that the oxirane itself is insoluble in water, the treatment with nitrogen compound may be accomplished in an organic solvent such as purified 1,4-dioxane. Other means of mechanically recovering purified alkylene oxide will be apparent to those skilled in the art.

Practice of the invention described herein is applicable to purification of alkylene oxide derived from any particular manufacturing process including epoxidation achieved as a result of the reaction of chlorohydrin with alkali, the catalytic oxidation of an olefin and reaction of an olefin with hydrogen peroxide in the presence of tungstic acid.

Alkoxides derived from metals from Groups I, II and III of the Periodic Table have been employed in the catalytic polymerization of alkylene oxide and have simultaneously resulted in the formation of carbonyl-containing impurities thought to result by rearrangement of the oxirane. It would be expedient to apply the herein described invention for the purpose of purifying recovered unreacted oxirane contaminated with an increased proportion of carbonyl impurities.

In the practice of this invention certain cases are recognized in which the quantity of carbonyl-containing impurity may be high as a result of operating conditions employed in the process from which the oxirane results. When sufficiently high concentrations of carbonyl-type impurities are present, the reaction product with the nitrogen compound may precipitate. Under these circumstances it is expedient to filter (or otherwise mechanically separate) the treated oxirane from the precipitated reaction product containing the impurity. Distillation procedures may then be applied to the filtrate to recover the purified product if desired.

The invention is further illustrated but is not intended to be limited by the following examples.

EXAMPLE I

Propylene oxide, 99.2 percent pure by weight, which contained carbonyl-bearing impurities in the amount of 0.30 weight percent expressed as propionaldehyde was placed in a typical laboratory distillation apparatus comprising a boiling flask and a 40-theoretical plate fractionation column packed with Pyrex glass helices and equipped with a condenser. The apparatus was then operated to obtain a reflux ratio of 10:1 while the boiling point was observed to remain constant at 33.5° C. under a barometric pressure of 736 millimeters of mercury. Material collected in the receiver of the distillation apparatus was analyzed and found to have reduced aldehyde content, e.g. 0.013 percent by weight.

This distillation apparatus was also operated at a 20:1 reflux ratio to result in 0.004 percent carbonyl-bearing material in the product. However operation at even the impractical high reflux ratio of 30:1 failed to reduce the aldehyde content found below the value of 0.002 percent. This was achieved, nevertheless, by employing an alternate fractionation column which possessed 100 theoretical plates to result in a sample of material containing less than 0.001 percent aldehyde.

EXAMPLE II

Propylene oxide was prepared in a continuous process by the reaction of an aqueous solution containing about 3 percent by weight of propylene chlorohydrin with a slurry of milk of lime. This reaction was carried out in a vertical glass reactor 4.5 centimeters in diameter by 60 centimeters in length which was packed with 0.25 inch ceramic saddles. This apparatus was arranged so that the incoming solution of propylene chlorohydrin fed by means of a pump was mixed with the slurry of milk of lime just prior to the point of entry at the top of the apparatus. These two reacting streams descended the column and contacted an ascending flow of steam introduced at the bottom of the column. This procedure resulted in removal of lower boiling components such as the propylene oxide resulting from the reaction in vapor form with excess steam. At the top of the column was located a condenser cooled with water at approximately 45° C. which resulted in condensation of water which returned to the reactor along with traces of unreacted chlorohydrin while permitting propylene oxide and other volatile components to escape from the condenser into a second condenser maintained at 0° C. to 5° C. whereupon substantially all propylene oxide was condensed to a liquid. It was found by prior experience that successful operation of this apparatus required the dimensions stated and also that an amount of milk of lime 10 percent in excess of the stoichiometric equivalent of propylene chlorohydrin was required. Unreacted lime and less volatile by-products were removed with excess water at the bottom of the apparatus. In this way 97.2 percent propylene oxide by weight was obtained and was found to contain from 0.1 percent to 0.2 percent by weight carbonyl-bearing material as propionaldehyde. A composite of several such preparations was contaminated with additional propionaldehyde to obtain a material containing 98.6 percent propylene oxide and 0.300 percent by weight propionaldehyde and minor amounts of other impurities including water. Two hundred milliliters was placed in a distillation flask along with 100 milliliters of water containing 2.0 grams of semicarbazide hydrochloride and 3.0 grams of sodium acetate. The flask and its contents were attached to a 40-plate Todd distillation column. The mixture was heated in this distillation equipment initially to establish a 30:1 reflux ratio to allow the apparatus to come to equilibrium and also to assure sufficient time for the semicarbazide hydrochloride to consume propionaldehyde. After 0.5 hour, the rate of distillation and product removal was increased to distill two samples, one at a reflux ratio of 10:1, the other at a new reflux ratio of 1:1. In this manner substantial removal of propionaldehyde was achieved as shown in the following table.

| Sample | Percent Propionaldehyde | Percent Propylene Oxide |
| --- | --- | --- |
| Initial material fortified with propionaldehyde | 0.300 | 98.6 |
| Distilled material collected at 10:1 reflux ratio | <0.001 | 99.7 |
| Distilled material collected at 1:1 reflux ratio | | 99.4 |
| Residue after distillation | 0.001 | |

It was observed that the reaction product of propionaldehyde with semicarbazide did not deposit in the distillation equipment and that the propionaldehyde was not merely separated by fractionation as in Example I and as shown by its absence in the residue after distillation.

The process described in Example II may be performed with successful purification of the propylene oxide using any of the nitrogen compounds listed above in lieu of semicarbazide. Similarly, the invention has been described as employed for the purification of an oxirane resulting from a manufacturing process, but is equally applicable to the purification of an oxirane resulting from any other manufacturing process as well as the purification of any oxirane contaminated with carbonyl materials derived from any source and present in an amount from 0.001 percent by weight up to 10 percent or more by weight. More than one functional group may also be present in the nitrogen compound. When this is the case, however, it is necessary that the second functional group be inert with respect to reaction with the oxirane.

While the invention has been described with reference to certain details of specific embodiments, it is not intended that the invention be construed as limited to such details except insofar as they appear in the following claims.

I claim:

1. A method of purifying an impure oxirane of 2 to 12 carbon atoms selected from the group consisting of ethylene oxide, propylene oxide, cis-2,3-epoxybutane, trans-2,3-epoxybutane, butadiene monoxide, butene oxide, amylene oxide, 1,2-hexene oxide, epoxycyclohexene, styrene oxide, alpha-naphthylethylene oxide, diglycid ether, glycidol, epichlorohydrin, epoxycyclopentane and vinylcyclohexene oxide produced by epoxidizing a lower olefinic hydrocarbon and which is contaminated by carbonyl impurities produced in the course of such epoxidation which comprises contacting at from 0° C. to 100° C. the impure oxirane with a compound of trivalent nitrogen selected from the group consisting of ammonia, an amine, a hydrazine, a hydroxylamine and a semi-carbazide having up to 12 carbon atoms and at least two hydrogen atoms linked to the nitrogen atom and which gives an alkaline reaction in water, the amount of said nitrogen compound being sufficient to selectively react with at least a portion of the carbonyl impurity but which is less than an amount which will consume more than 10 percent of the oxirane, and separating the oxirane from the resulting mixture.

2. A method of purifying an oxirane of 2 to 12 carbon atoms selected from the group consisting of ethylene oxide, propylene oxide, cis-2,3-epoxybutane, trans-2,3-epoxybutane, butadiene monoxide, butene oxide, amylene oxide, 1,2-hexene, oxide, epoxycyclohexene, styrene oxide, alpha-naphthylethylene oxide, diglycid ether, glycidol, epichlorohydrin, epoxycyclopentane and vinylcyclohexene oxide contaminated with a minor amount of carbonyl impurity which comprises contacting at from 0° C. to 100° C. the impure oxirane with a solution containing from 1 to 15 percent by weight of a compound of nitrogen selected from the group consisting of ammonia, an amine, a hydrazine, a hydroxylamine and a semi-carbazide containing up to 12 carbon atoms and at least one trivalent nitrogen atom to which are linked at least two hydrogen atoms and which gives an alkaline reaction in water until the nitrogen compound is substantially consumed, the amount of said nitrogen compound being sufficient to selectively react with at least a portion of the carbonyl impurity but which is less than an amount which will consume more than 10 percent of the oxirane, and separating the oxirane from the resulting mixture.

3. A method of purifying propylene oxide contaminated with a minor amount of propionaldehyde which comprises contacting at from 0° C. to 100° C. the impure propylene oxide with a compound of trivalent nitrogen selected from the group consisting of ammonia, an amine, a hydrazine, a hydroxylamine and a semi-carbazide having up to 12 carbon atoms and at least two hydrogen atoms linked to the nitrogen atom and which gives an alkaline reaction in water, the amount of said nitrogen compound being sufficient to selectively react with at least a portion of the propionaldehyde but which is less than an amount which will consume more than 10 percent of the propylene oxide, and separating the propylene oxide from the resulting mixture.

4. A method of purifying propylene oxide contaminated with a minor amount of carbonyl impurity which comprises contacting at from 0° C. to 100° C. the impure propylene oxide with a solution containing from 1 to 15 percent by weight of a compound of nitrogen selected from the group consisting of ammonia, an amine, a hydrazine, a hydroxylamine and a semi-carbazide containing up to 12 carbon atoms and at least one trivalent nitrogen atom to which are linked at least two hydrogen atoms and which gives an alkaline reaction in water until the nitrogen compound is substantially consumed, the amount of said nitrogen compound being sufficient to selectively react with at least a portion of the carbonyl impurity but which is less than an amount which will consume more than 10 percent of the propylene oxide, and separating the propylene oxide from the resulting mixture.

5. A method of purifying an oxirane of 2 to 12 carbon atoms selected from the group consisting of ethylene oxide, propylene oxide, cis-2,3-epoxybutane, trans-2,3-epoxybutane, butadiene monoxide, butene oxide, amylene oxide, 1,2-hexene oxide, epoxycyclohexene, styrene oxide, alpha-naphthylethylene oxide, diglycid ether, glycidol, epichlorohydrin, epoxycyclopentane and vinylcyclohexene oxide contaminated with a minor amount of carbonyl impurity which comprises contacting at from 0° C. to 100° C. the impure oxirane with a solution containing from 1 to 15 percent by weight of semicarbazide for from 1 to 30 minutes, the amount of semicarbazide being sufficient to selectively react with at less a portion of the carbonyl impurity but which is less than an amount which will consume more than 10 percent of the oxirane, and separating the oxirane from the resulting mixture.

6. A method of purifying propylene oxide contaminated with a minor amount of carbonyl impurity which comprises contacting at from 0° C. to 100° C. a solution containing from 1 to 15 percent by weight of semicarbazide with the propylene oxide for from 1 to 30 minutes, the amount of said semicarbazide being from 0.1 to 3.0 moles per mole of the carbonyl impurity but less than the amount which will consume more than 10 percent of the propylene oxide, maintaining a pH range of 4 to 7 by the addition of a sodium salt of an acid having a dissociation constant less than 0.05, and separating the propylene oxide from the resulting mixture.

7. A method of purifying propylene oxide contaminated with a minor amount of carbonyl impurity which comprises contacting at from 0° C. to 100° C. a solution containing from 1 to 15 percent by weight of semicarbazide with the propylene oxide for from 1 to 30 minutes, the amount of said semicarbazide being from 0.1 to 3.0 moles per mole of the carbonyl impurity but less than the amount which will consume more than 10 percent of the propylene oxide, maintaining a pH of 4 to 7 by the addition of sodium acetate, and separating the propylene oxide from the resulting mixture.

References Cited in the file of this patent
UNITED STATES PATENTS

| | | |
|---|---|---|
| 2,631,970 | Barnes | Mar. 17, 1953 |
| 2,697,104 | Lowe et al. | Dec. 14, 1954 |
| 2,876,253 | Hughes et al. | Mar. 3, 1959 |
| 2,903,477 | Hughes et al. | Sept. 8, 1959 |
| 2,993,916 | Normington | July 25, 1961 |
| 3,022,259 | Pearce | Feb. 20, 1962 |

OTHER REFERENCES

Chem. and Eng. News, vol. 37, pages 49 and 50, April 20, 1959.